US011301577B2

(12) United States Patent
Grindrod

(10) Patent No.: US 11,301,577 B2
(45) Date of Patent: Apr. 12, 2022

(54) SYSTEM AND METHOD FOR PROTECTING INFORMATION FROM UNAUTHORIZED ACCESS

(71) Applicant: Geoffrey Bernard Grindrod, Santa Clara, CA (US)

(72) Inventor: Geoffrey Bernard Grindrod, Santa Clara, CA (US)

( * ) Notice: Subject to any disclaimer, the term of this patent is extended or adjusted under 35 U.S.C. 154(b) by 0 days.

(21) Appl. No.: 16/774,455

(22) Filed: Jan. 28, 2020

(65) Prior Publication Data

US 2020/0210607 A1    Jul. 2, 2020

Related U.S. Application Data

(63) Continuation-in-part of application No. 15/476,198, filed on Mar. 31, 2017, now abandoned.

(51) Int. Cl.
*G06F 21/62* (2013.01)
*G06F 21/56* (2013.01)
(Continued)

(52) U.S. Cl.
CPC ...... *G06F 21/6218* (2013.01); *G06F 11/1464* (2013.01); *G06F 11/1469* (2013.01);
(Continued)

(58) Field of Classification Search
CPC ......... G06F 2221/2107; G06F 21/6218; G06F 21/31; G06F 21/56; G06F 16/168; G06F 11/1464; G06F 11/1469
See application file for complete search history.

(56) References Cited

U.S. PATENT DOCUMENTS 7,263,588 B1 *  8/2007  Moritz .............. H04L 63/0428
                                                    713/193
9,489,525 B2 * 11/2016  Biskeborn ........... H04L 9/0894
(Continued)

*Primary Examiner* — Daniel B Potratz

(57) ABSTRACT

In a digital computing environment, a method of protecting stored and transmitted computer original files from unauthorized access, by encoding a series of physically allowed restore locations into a plurality of site-specific protected site data files, and rearranging the internal structure of the original file's byte data into a specified non-linear sequence, and storing them into the plurality of site-specific protected site data files. The protected site data files can then be individually stored across two or more physical and/or online storage sites to implement an effective form of file security.
A user selects the original files they want to protect, a plurality of physical allowed restore locations, and a plurality of storage sites they wish to use to protect their original files. Each original file is processed at the bitwise level, with each successive bit from each successive byte being appended to the next successive protected site data file. When the last site data file is reached, the process continues back at the first site data file.
The resulting output is a series of protected site data files which, when physically separated cannot be accessed by an attacker without having collected all other protected site data files available. In the event that the attacker is somehow able to collect all of the protected site data files, they are still restricted from restoring them, unless they are physically present at one of the previously designated allowed restore locations.

4 Claims, 16 Drawing Sheets

Flowchart of Protect Process

(51) Int. Cl.
  *G06F 11/14* (2006.01)
  *G06F 16/16* (2019.01)
  *G06F 21/31* (2013.01)
(52) U.S. Cl.
  CPC ............ *G06F 16/168* (2019.01); *G06F 21/31* (2013.01); *G06F 21/568* (2013.01)

(56) References Cited

U.S. PATENT DOCUMENTS

2002/0042859 A1* 4/2002 Lowry ................ G06F 21/6218
  711/100
2017/0104736 A1* 4/2017 Seul ........................ H04L 67/10

* cited by examiner

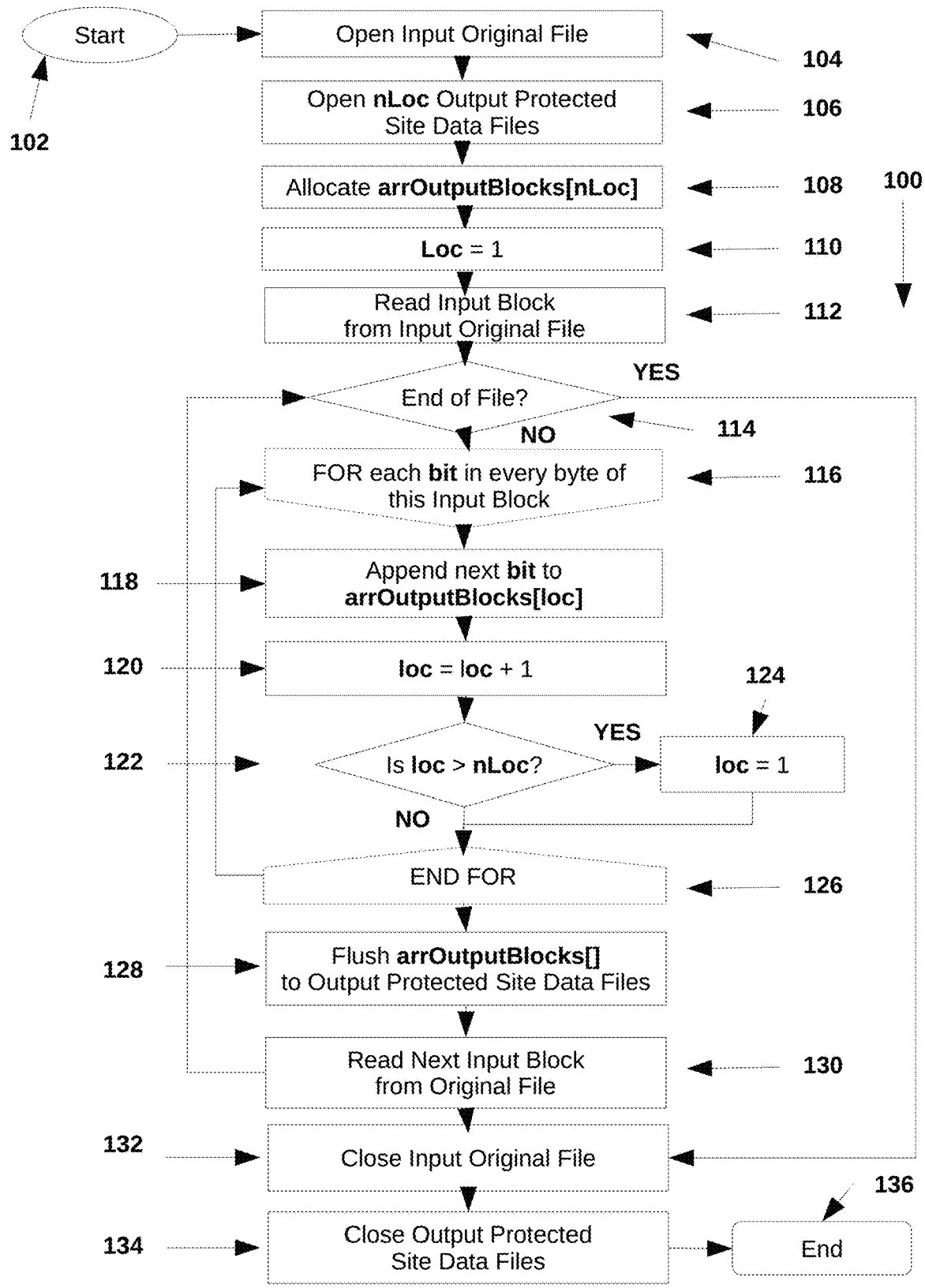
FIG 1. Flowchart of Protect Process

FIG 1A. Site Selection Screen
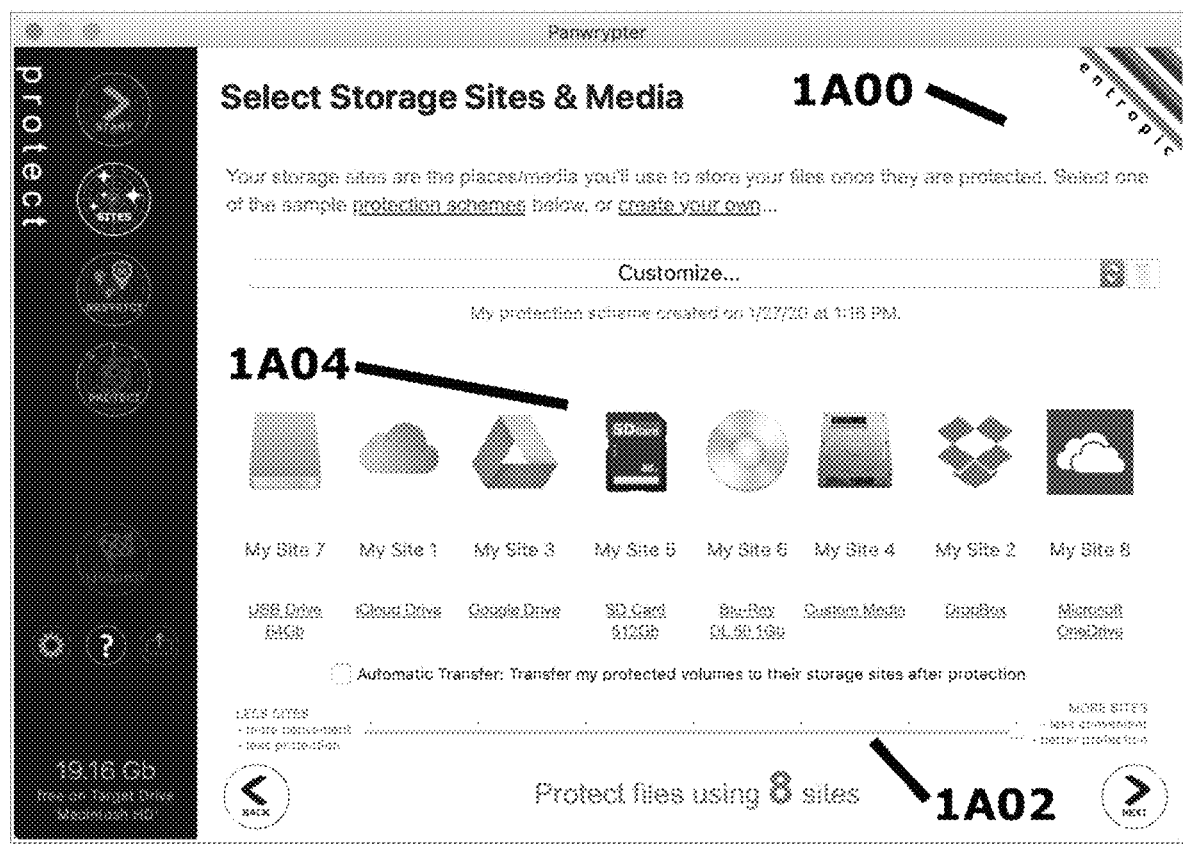

FIG 1B. Allowed Restore Locations
Selection Screen (Zoomed In)
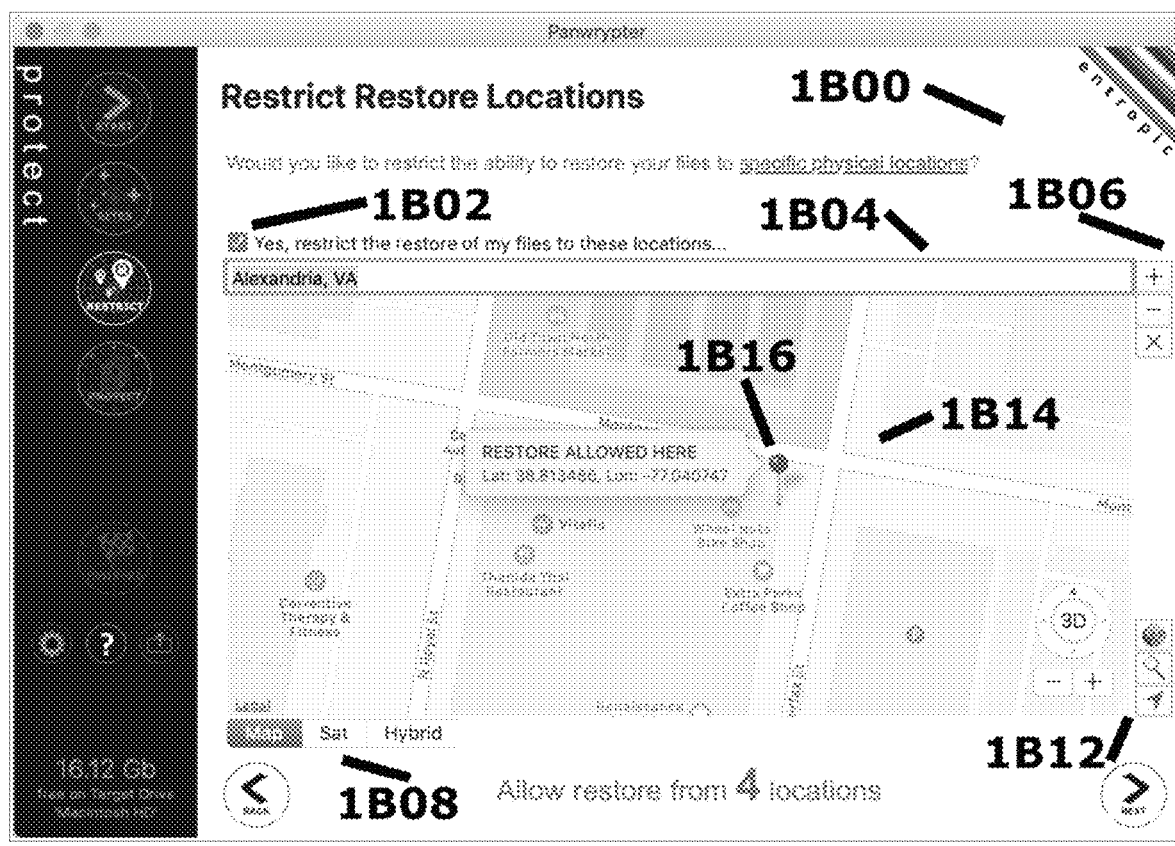

FIG 1C. Allowed Restore Locations Selection Screen (Zoomed Out)
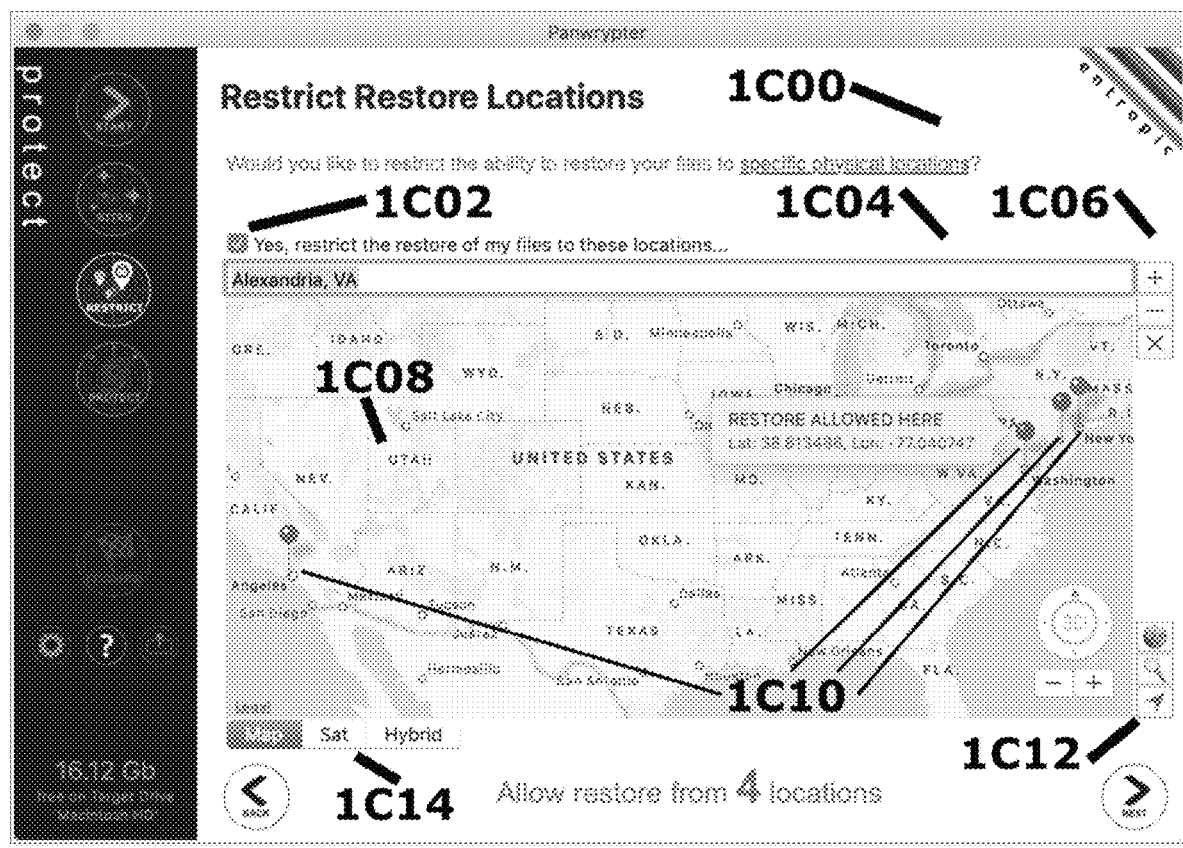

FIG 1D. Original Files Selection Screen
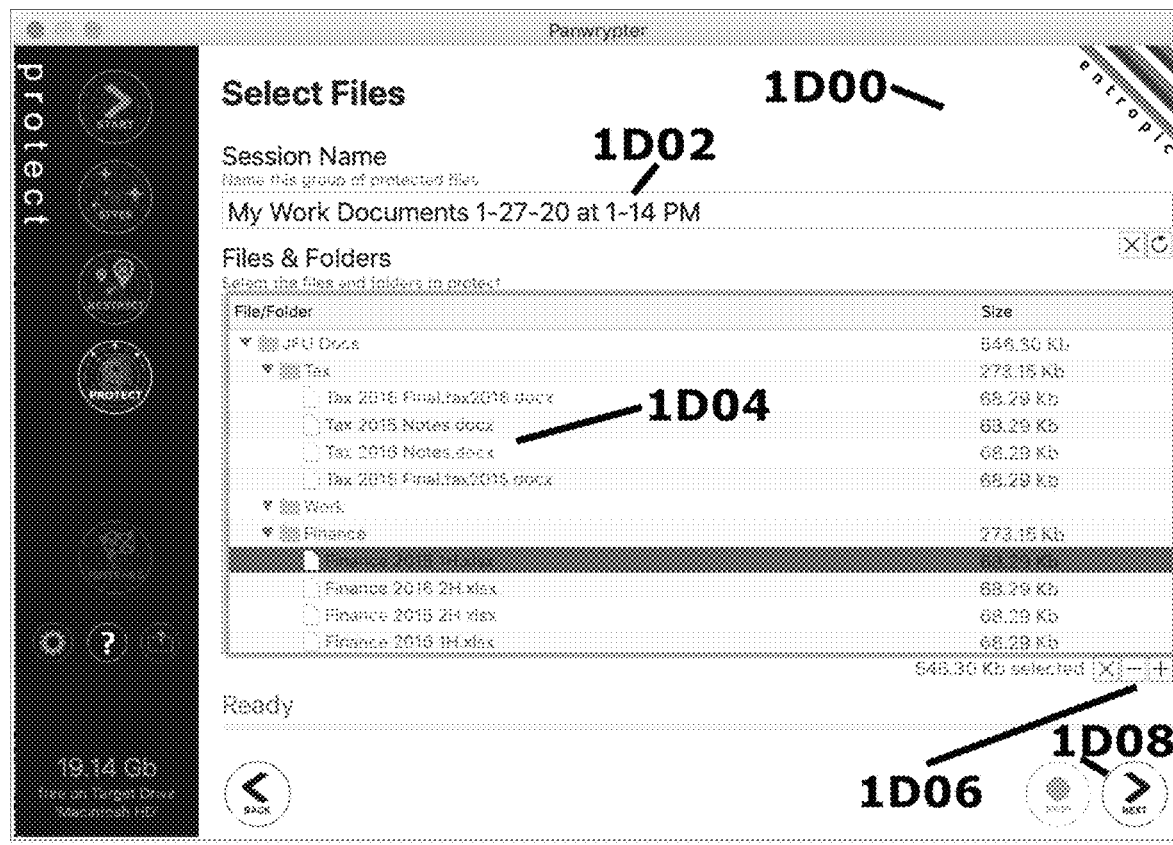

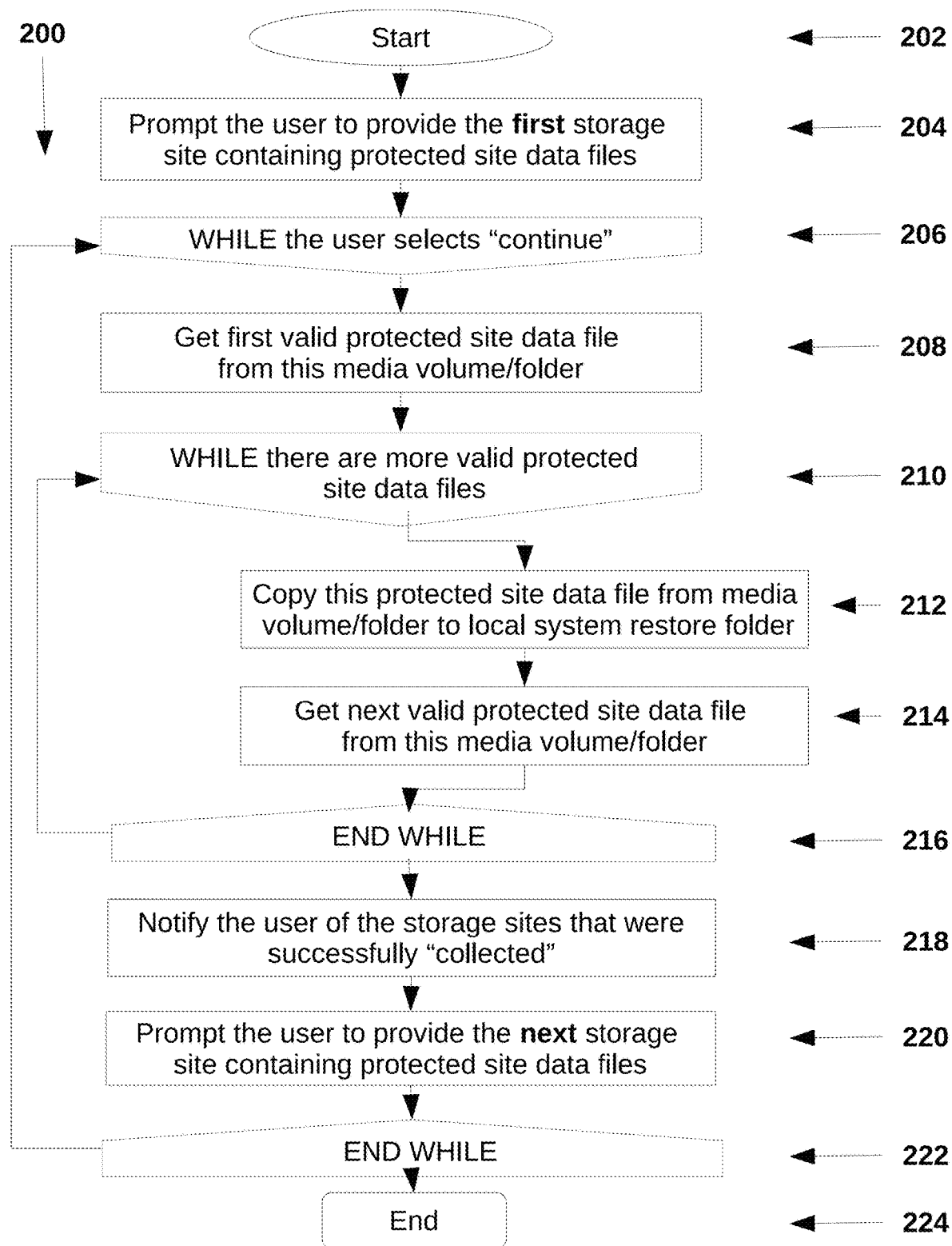

FIG 2A. Protected Site Data File Collection Screen
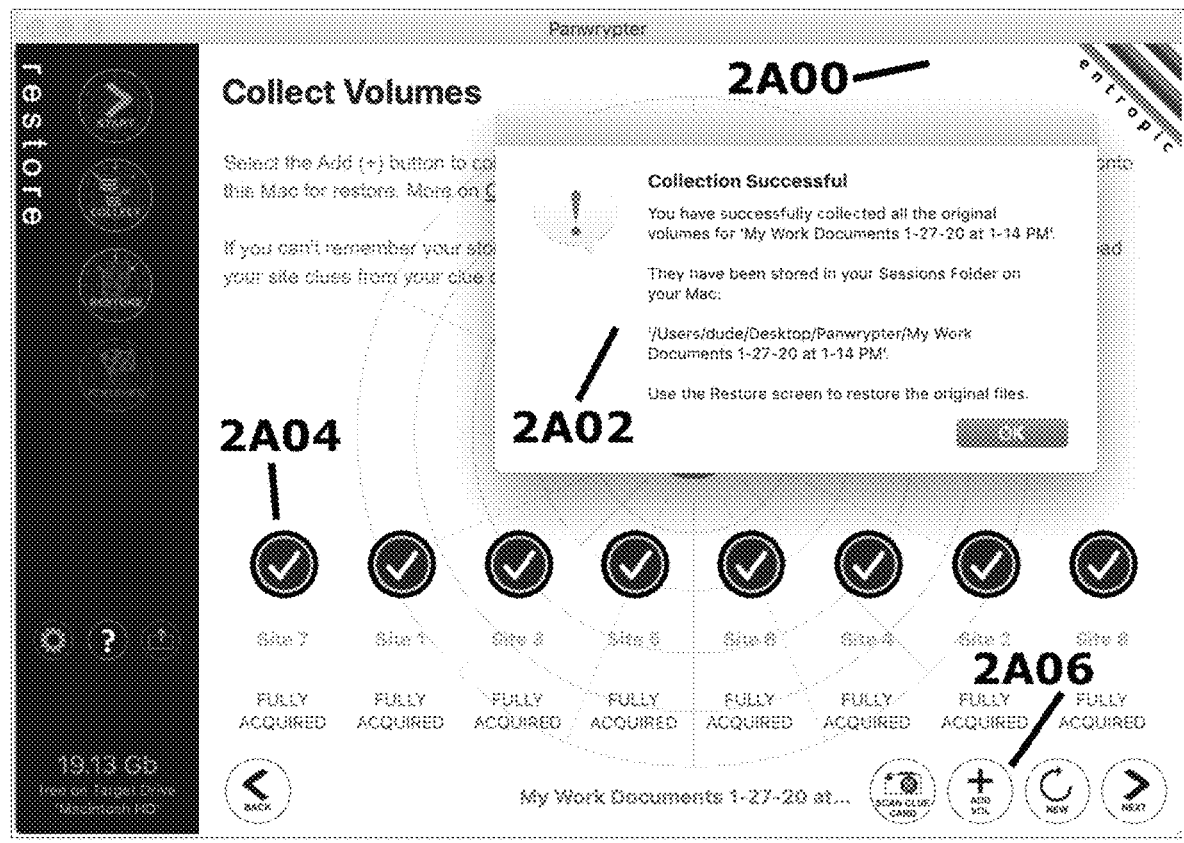

FIG 3. Flowchart of Restore Process
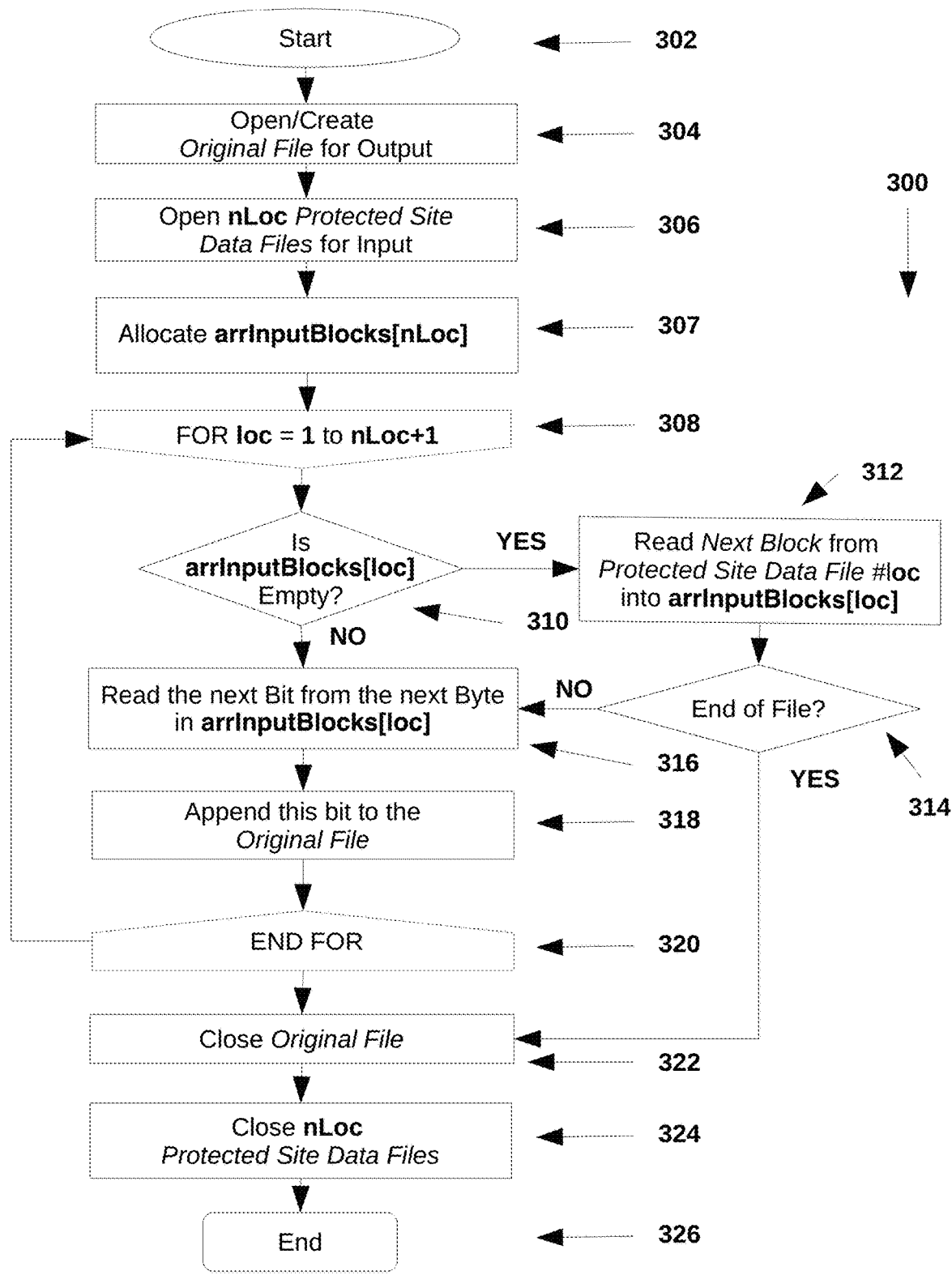

FIG 3A. Protected Site Data Files Restore Screen
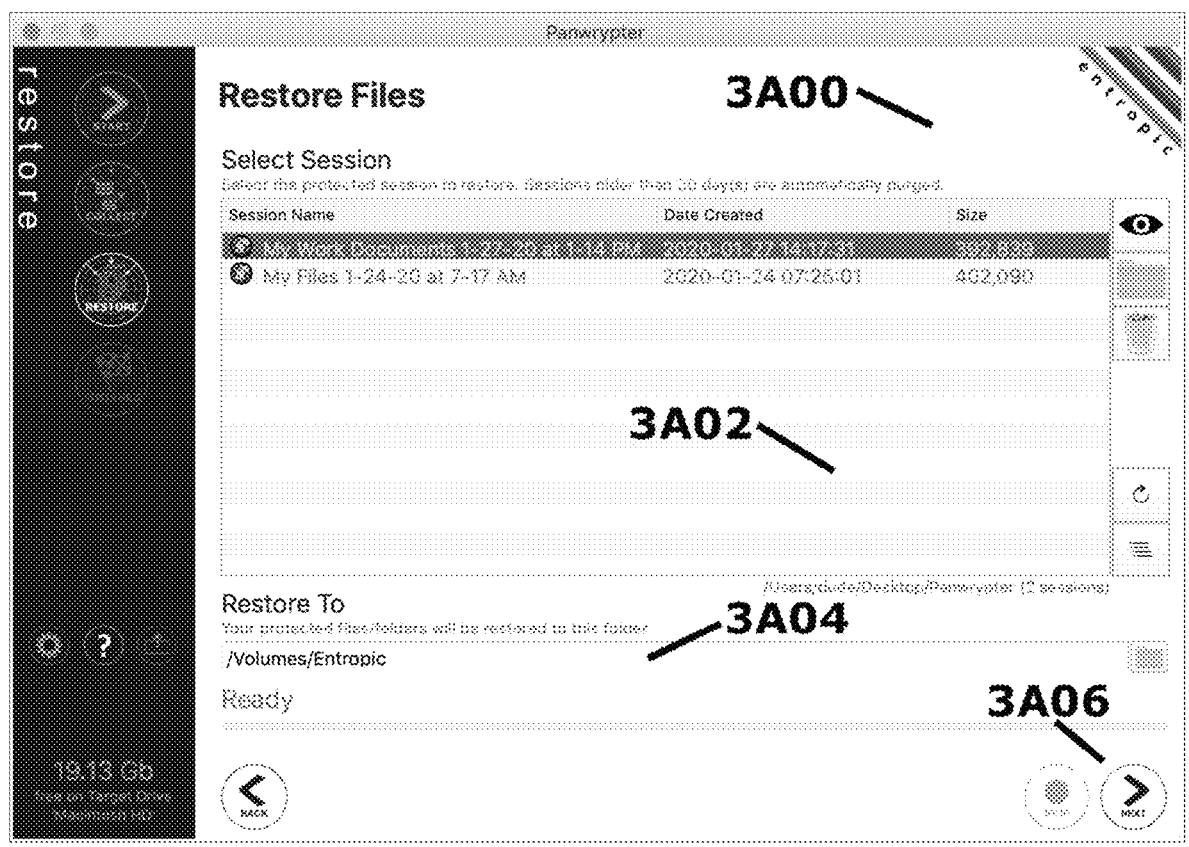

FIG 3B. Protected Site Data Files Restore Denied Screen (Unauthorized Restore Location)

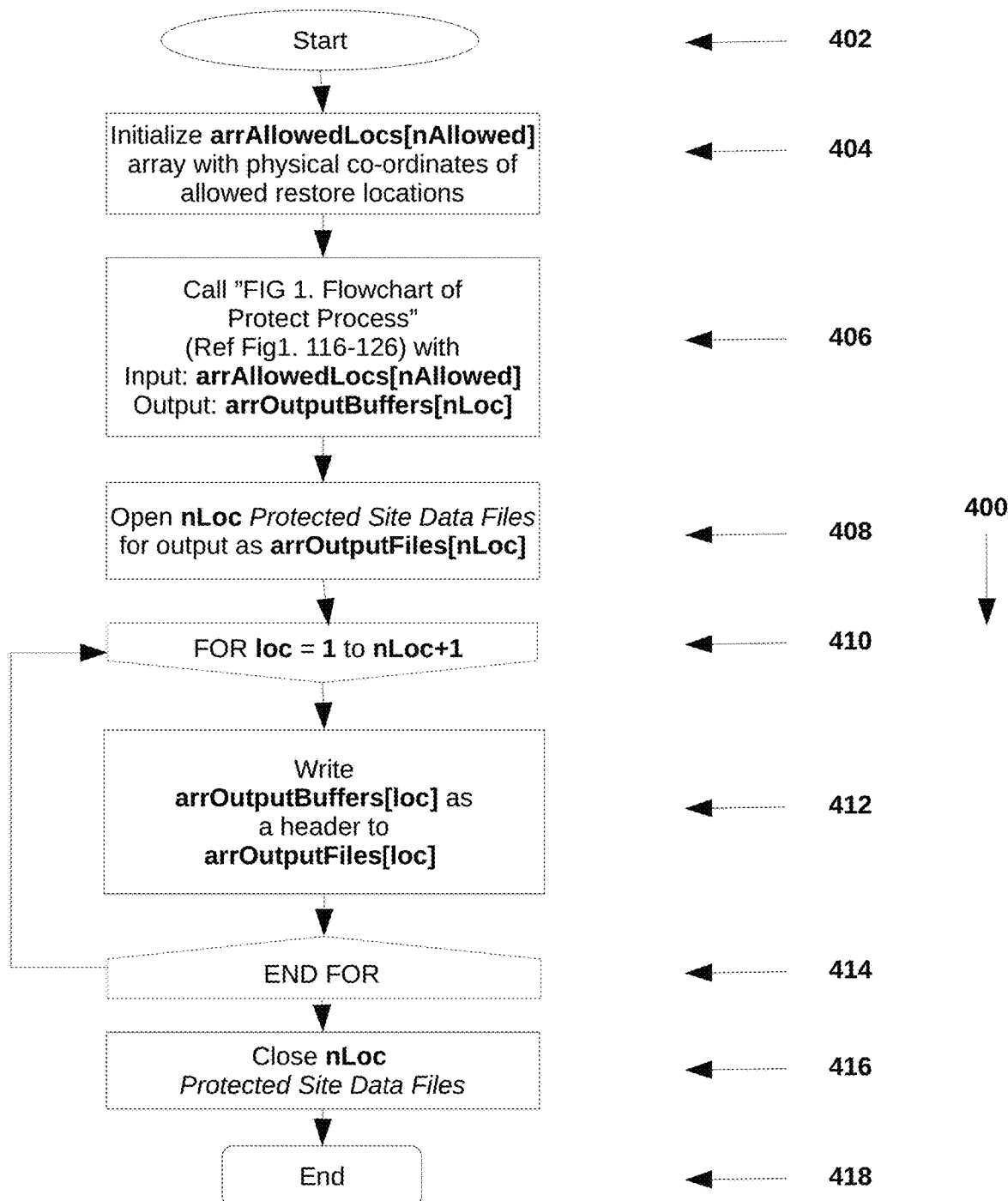
FIG 4. Encoding the Allowed Restore Locations into the Protected Site Data Files

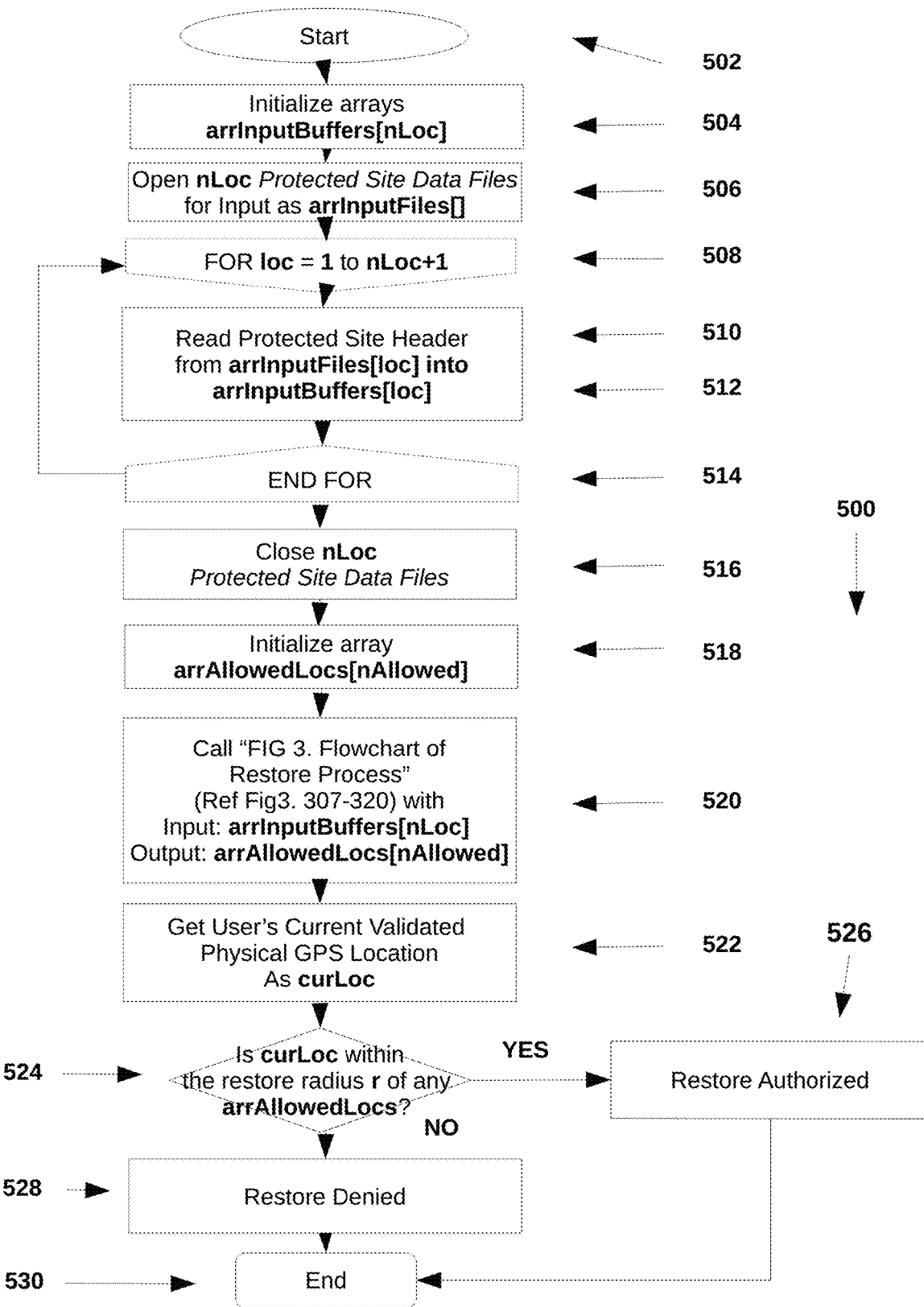

**FIG 6 Example:
Deployment of Protected Site Data Files across
Two Cloud File Storage Providers**
- Protected Site Data File #1 deployed to an online storage site (*Cloud file storage provider* - Google *Drive*)
- Protected Site Data File #2 deployed to an online storage site (*Cloud file storage provider* – Apple *iCloud Drive*)
(2 Sites or nLoc=2)
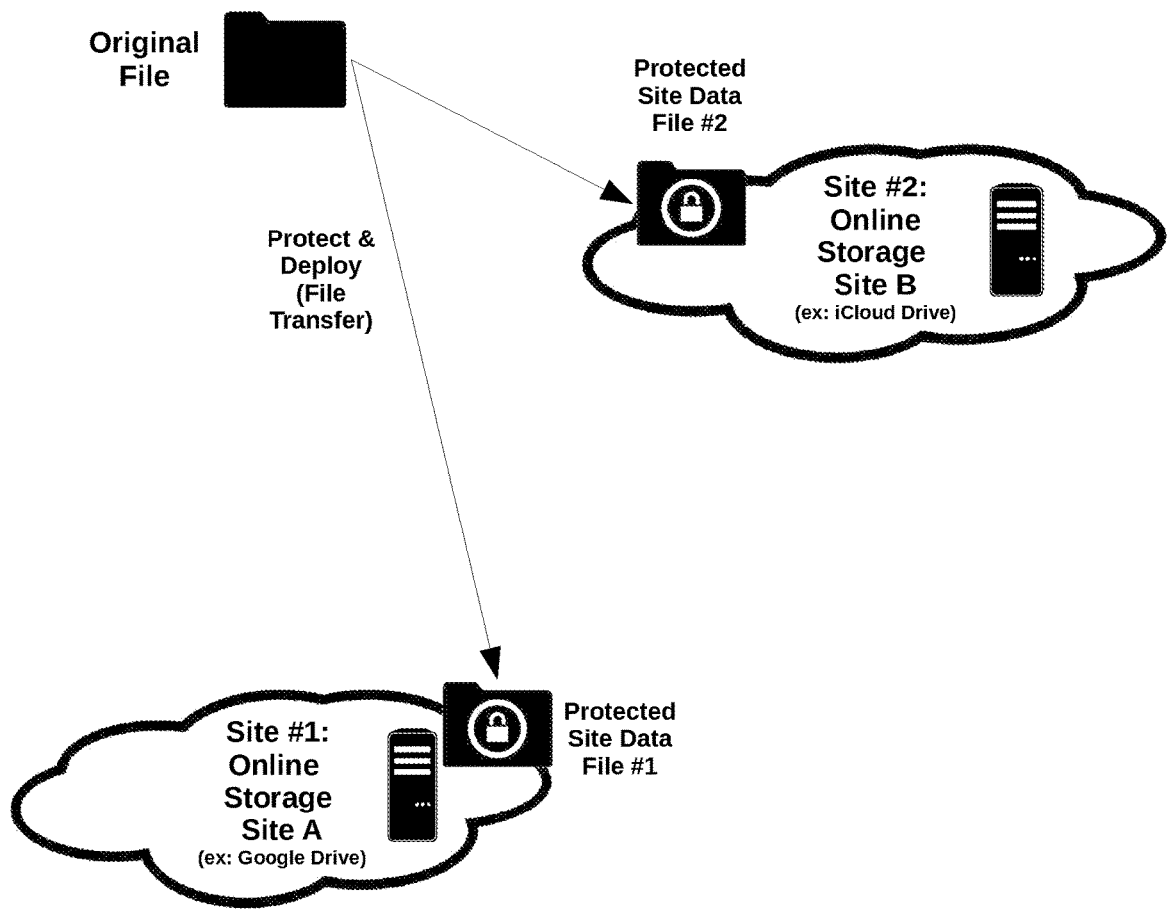

FIG 7 Example:
Deployment of Protected Site Data Files across
A Users Home and a Cloud File Storage Provider
- Protected Site Data File #1 deployed to a *physical storage site* (*DVD* at the *user's home*)
- Protected Site Data File #2 deployed to an *online storage site* (Cloud file storage provider – Apple *iCloud Drive*)
(2 Sites or nLoc=2)
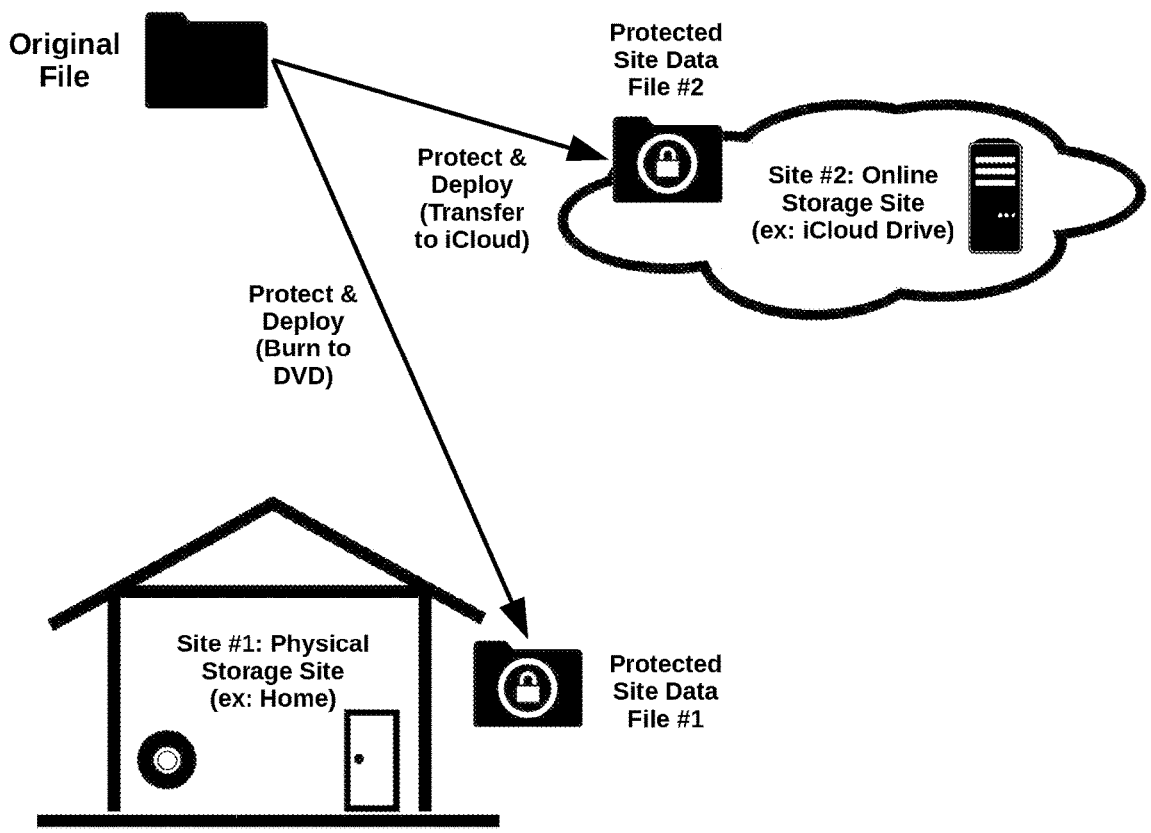

FIG 8 Example:
Deployment of Protected Site Data Files across
A Users Home, a Bank Safety Deposit Box, and a
Cloud File Storage Provider

- Protected Site Data File #1 deployed to a *physical storage site* (*DVD* at the *user's home*)
- Protected Site Data File #2 deployed to a *physical storage site* (*Blu-ray* in a *safe deposit box*)
- Protected Site Data File #3 deployed to an *online storage site* (*Cloud File Storage provider* - Google *Drive*)
(3 Sites or nLoc=3)

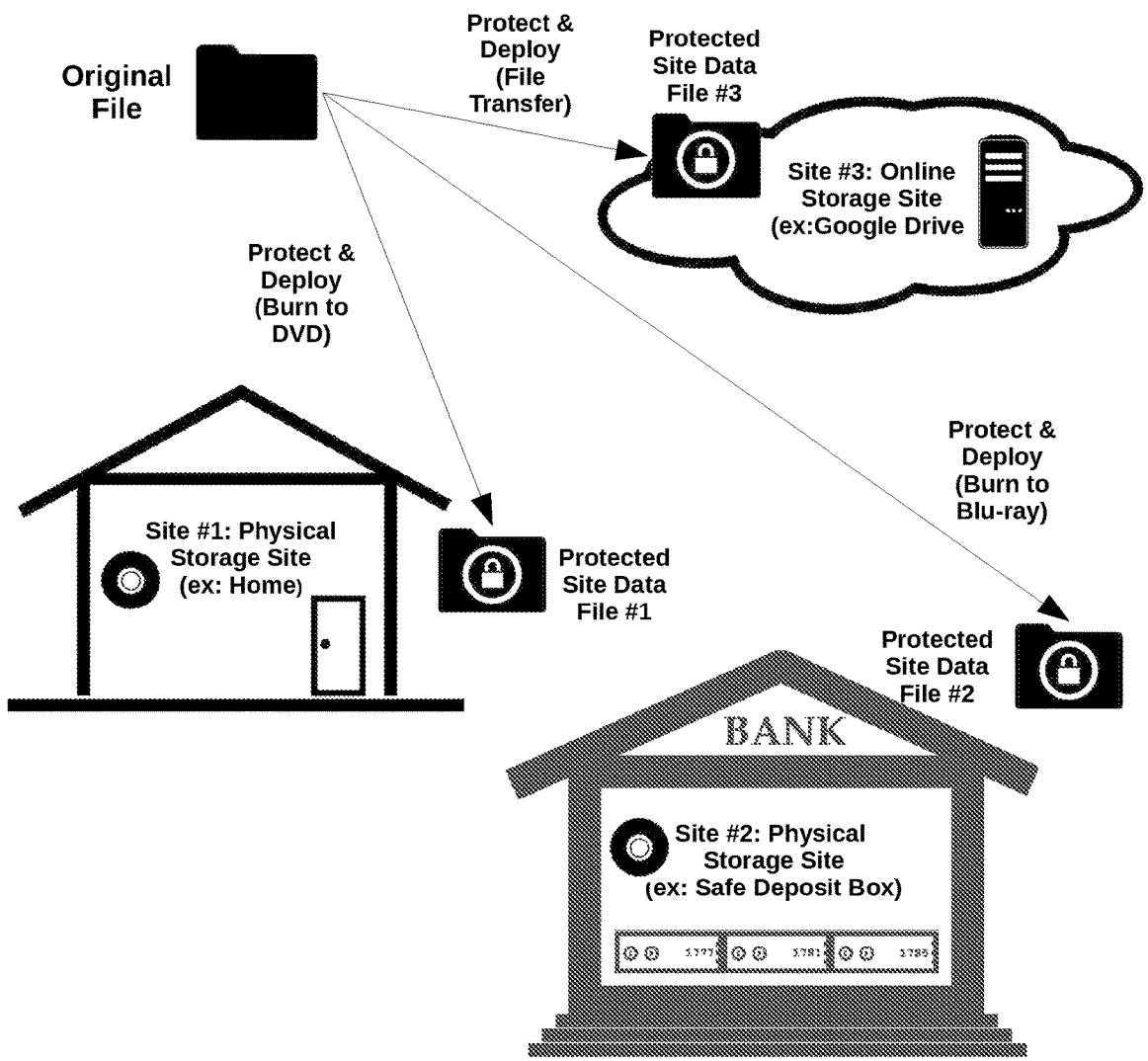

**FIG 9 Example:
Deployment of Protected Site Data Files across
2 E-mail Accounts on Separate Mail Servers**
- Protected Site Data File #1 deployed to an online storage site (Mail account hosted by Google *Gmail*)
- Protected Site Data File #2 deployed to an online storage site (Mail account hosted by Yahoo! Mail)
(2 Sites or nLoc=2)
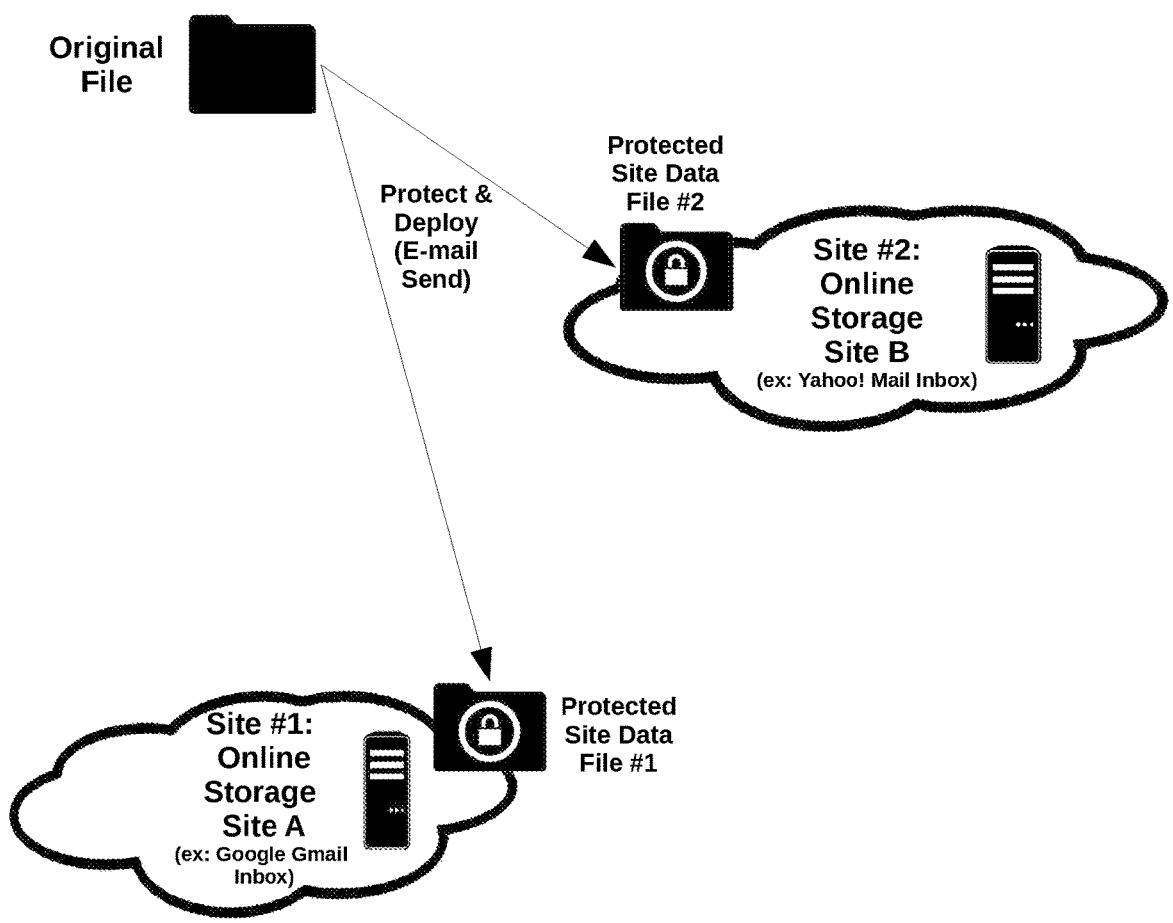

SYSTEM AND METHOD FOR PROTECTING INFORMATION FROM UNAUTHORIZED ACCESS

CROSS REFERENCES

U.S. Patent Documents

Related to Decentralized File Protection
US-20020042859-A1 Apr. 2002 Lowry
U.S. Pat. No. 9,489,525-B2 Nov. 2016 Biskeborn
US-20070038681-A1 Feb. 2007 Pierce
US-20170104736-A1 Apr. 2017 Seul
US-20180189137-A1 Jul. 2018 De Keyser
Related to Physical Location Based File Protection
U.S. Pat. No. 8,195,939-B2 Jun. 2012 Reinart
U.S. Pat. No. 8,577,042-B2 Nov. 2013 Worthy
U.S. Ser. No. 10/192,039-B2 Jan. 2019 Huang
US-20080172745-A1 Jul. 2008 Manfred
US-20120102549-A1 Apr. 2012 Mazzaferri

FIELD OF THE INVENTION

The present invention relates generally to methods, systems and software for protecting stored information from unauthorized access, including interception by people, such as as cyber-criminals, nation-state actors; software, such as malware, APTs, trojans, ransomware, remote access trojans that may infiltrate a computer or other digital processor.

In particular, the present invention relates to methods, systems and software that rearranges and separates the bitwise structure of sensitive original files into separate, nonlinear protected site data files, which can then be individually stored in separate physical and/or online storage sites to accomplish effective data protection.

Sensitive original files could include documents, customer databases, sensitive company information, client information, contacts lists, spreadsheets, custom/proprietary data files, and media such as photographs and movies.

Sensitive data files could include documents, customer databases, sensitive company information, client information, contacts lists, spreadsheets, custom/proprietary data files, and media such as photographs and movies.

In the event that the protected site data files are somehow accessed and collected from all of their respective physical and/or online storage sites, an additional security measure restricts the protected site data files to being restored from a specific set of authorized physical restore locations.

BACKGROUND OF THE INVENTION

As use of the Internet increases, the resulting problems and harmful effects of cyber-attacks, including targeted attacks, advanced persistent threats (APTs), and ransomware, results in an ever-increasing incidence of systems compromise, and theft and loss of stored information (data breaches).

In the systems realm, cyber-attacks present a substantial security risk to files and information that are holistically stored and accumulate on, or are transmitted to/from computer systems that exist as servers, virtualized systems, mobile devices, dedicated-purpose (IoT) devices, or desktop systems.

Additionally, physical security risks, such as theft and corporate espionage also present a security risk to stored files and information that is holistically stored in one physical location on, for instance a server, storage media such as CD/DVD/Blu-ray, flash storage, network attached storage, or removable drives.

To protect files and information from reverse engineering/decryption, new methods of encryption, such as RSA, AES, DES, and recently Quantum Encryption are developed to supersede older methods. These methods are constantly being subject to reverse engineering investigation processes, with some having historically been subverted by ongoing intense investigation by the scientific community, and hackers.

These people have the advantage of a steady increase in available, low cost, hardware systems processing power, along with previously unconsidered approaches to reverse engineering, such as exploiting buggy or neglected implementations and side channel attacks. When combined with time, effort and processing power, the chances of successfully reverse engineering these current methods of encryption increases.

Most forms of encryption produce transformed representations of files and information that exist holistically in one physical or online location, and are stored and commonly even neglected there, over a significant period of time. As a result, when the encryption is ultimately reverse-engineered, the original information is fully available to the attacker.

It would be desirable to provide methods, systems and software products that could enable the user to conveniently prepare their files and information for a more definitive type of file protection which uses physical separation, online separation, or a mix of both, as a key factor in securing the data.

This approach would result in a more reliable form of file protection that is more resilient against data breaches and physical security breaches over time. It would give the owner more peace of mind, and reduce the necessity for them to continually monitor access to, and regularly re-encrypt their files and information over time, as existing methods of encryption become obsolete or outdated.

Examples of Cyber-Attacks

Targeted Attacks: (an example of which is StuxNet) is a class of malware destined for specific organizations or industries. A type of crime-ware, these threats are of particular concern because they are designed to capture sensitive information and even control automated systems in the physical realm. Targeted attacks may include threats delivered either via social engineering tactics, or directly via e-mail, port attacks, zero day attack vulnerability exploits or phishing messages. Government organizations and Financial industries are examples of the most targeted industries.

Advanced Persistent Threat (APT): (an example of which are Xagent, or Grizzly Steppe) is a set of stealthy and continuous computer hacking processes, often orchestrated by a person or persons targeting a specific entity. An APT usually targets either private organizations, states or both for business or political motives. APT processes require a high degree of covertness over a long period of time. The "advanced" process signifies sophisticated techniques using malware to exploit vulnerabilities in systems. The "persistent" process suggests that an external command and control system is continuously monitoring and extracting data from a specific target. The "threat" process indicates human involvement in orchestrating the attack.

Malware: (an example of which is Dridex) short for malicious software, includes viruses, bots, bugs, ransomware, spyware, root-kits, trojan horses, backdoors, keyloggers, rogue security software, and hijackers. It is any software used to disrupt computer or mobile operations, gather sensitive information, gain access to private computer systems, or display unwanted advertising. These days malware is also used as a core component of Targeted Attacks and APTs.

Ransomware: Such software: (an example of which is Crypt® Locker, or Dharma) is computer malware that installs covertly on a victim's computer, executes a cryptovirology attack that adversely affects files on the computer, and demands a ransom payment to decrypt or not publish them. Simple ransomware may lock files in a way that is not difficult for a knowledgeable person to reverse, and display a message requesting payment to unlock it. More advanced ransomware encrypts the victim's files, making them inaccessible, and demands a ransom payment to decrypt them.

Remote Access Trojan (RAT): (an example of which is Sakula) is a piece of software that allows a remote "operator" to control a system as if they have physical access to that system. While desktop sharing and remote administration have many legal uses, "RAT" software is usually associated with criminal or malicious activity. Malicious RAT software is typically installed without the victim's knowledge, often as payload of a Trojan horse, and will try to hide its operation from the victim and from security software.

Computer and Network Surveillance Software: (an example of which is Teramind) allows the monitoring of computer activity and data stored on a hard drive, or data being transferred over computer networks such as the Internet. The monitoring is often carried out covertly and may be completed by governments, corporations, criminal organizations, or individuals. It may or may not be legal and may or may not require authorization from a court or other independent government agency.

Trojanized Software: (an example of which is the fake version of PuTTY—an open source terminal emulator) is legitimate software that has been modified or compromised in some way that changes it's behavior for malicious purposes. Software can also start out as being legitimate, then later have it's behavior changed via a software update.

Operating System and Software Vulnerabilities: (an example of which is CVE-2016-3321) is a weakness which allows an attacker to reduce a system's information assurance. Vulnerability is the intersection of three elements: a system susceptibility or flaw, attacker access to the flaw, and attacker capability to exploit the flaw. To exploit a vulnerability, an attacker must have at least one applicable tool or technique that can connect to a system weakness. In this frame, vulnerability is also known as the attack surface.

Social Engineering Attacks: (an example of which are falsified e-mails from the IRS, FedEx, and Financial Institutions) trick the user into installing malware components, such as the Zeus banking trojan. From there, account passwords can be captured and used to gain access to online services, including file storage and online banking services.

Man-in-the-middle Attacks: occur when someone between you and the system or entity with whom you are communicating is actively monitoring, capturing, and controlling your communication transparently. For example, the attacker can re-route a data exchange. When computers are communicating at low levels of the network layer, the computers might not be able to determine with whom they are exchanging data.

Sniffer Attacks: occur when an application or device is employed on a computer network that can read, monitor, and capture network data exchanges and read network packets. If the packets are not encrypted, a sniffer provides a full view of the data inside the packet. Even encapsulated (tunneled) packets can be broken open and read unless they are encrypted and the attacker does not have access to the key.

Application-Layer Attacks: occurs when an attacker creates a fault in a server's operating system or applications. This results in the attacker gaining the ability to bypass normal access controls. The attacker takes advantage of this situation, gaining control of your application, system, or network.

Compromised-Key Attack: occurs when an attacker illegally obtains a key through nefarious monitoring and infiltration of a network. After an attacker obtains a key, that key is referred to as a compromised key.

Brute Force Password Attacks: (an example of which is L0phtcrack) are a trial and error method used by application programs to decode encrypted data such as passwords or Data Encryption Standard (DES) keys, through exhaustive effort (using brute force) rather than employing intellectual strategies.

Examples of Physical Attacks

Accidental Physical Data Loss—storage media with sensitive data is lost by the user. Example: A USB stick with sensitive patient information is left accidentally in a rental car by a hospital employee.

Physical Neglect—sensitive information made available to an attacker as a result of physical neglect of the sensitive data. Example: Sensitive backup data is left on DVD's in an unlocked storage room that is accessible by anyone.

Physical Theft—sensitive data files are targeted and stolen by an employee via physical means. Example: A disgruntled employee targets and steals a series of backup tapes from a co-workers office.

SUMMARY OF THE INVENTION

The present invention provides the methods, systems and tools to protect original files by processing their content in the manner described, and outputting a series of protected site data files that can be individually stored across a series of physical and/or online storage sites. It also provides the ability to collect back the protected site data files, and restore the original files to their original form.

The present invention also includes the ability to restrict where the protected site data files may be physically restored from, by allowing the user to designate a plurality of allowed restore locations during the initial protection of the original files.

Additional detail of embodiments and practices in accordance with the present invention will next be set forth in connection with the attached drawings.

BRIEF DESCRIPTION OF DRAWINGS

FIG. 1 is a flowchart describing the process of protecting a plurality of original files using bit separation, and outputting them to a plurality of protected site data files, in accordance with the protective aspect of the present invention.

FIG. 1A is a screenshot depicting a file protection application allowing the user to select a plurality of storage sites, storage media type, and storage location to use for file protection, in accordance with the protective aspect of the present invention.

FIG. 1B is a screenshot depicting a file protection application that provides a map that is zoomed in, to allow the user to designate a plurality of physical allowed restore locations, from where the protected site data files may be restored, in accordance with the protective aspect of the present invention.

FIG. 1C is a screenshot depicting a file protection application that provides a map that is zoomed out, to allow the user to designate a plurality of physical allowed restore locations, from where the protected site data files may be restored, in accordance with the protective aspect of the present invention.

FIG. 1D is a screenshot depicting a file protection application allowing the user to select a plurality of original files that they wish to protect, in accordance with the protective aspect of the present invention.

FIG. 2 is a flowchart describing the process of collecting or re-grouping a plurality of protected site data files that were originally created during the protect process, in preparation for a restore of original files, in accordance with the restorative aspect of the present invention.

FIG. 2A is a screenshot depicting a file protection application allowing the user to collect/regroup a plurality of protected site data files back together, in preparation for a restore of original files, in accordance with the restorative aspect of the present invention.

FIG. 3 is a flowchart describing the process of restoring a plurality of protected site data files back to their original files, in accordance with the restorative aspect of the present invention.

FIG. 3A is a screenshot depicting a file protection application allowing the user to restore a plurality of protected site data files—the session, in accordance with the restorative aspect of the present invention.

FIG. 3B is a screenshot depicting a file protection application denying (3B02) the user from restoring a plurality of protected site data files—the session, because they are not physically within a range designated by a restore radius of one or more of the allowed restore locations encoded into the protected site data files, in accordance with the restorative aspect of the present invention.

FIG. 4 is a flowchart describing the process of encoding a plurality of allowed restore locations into a plurality of protected site data files, in accordance with the protective aspect of the present invention.

FIG. 5 is a flowchart describing the process of decoding a plurality of allowed restore locations from a plurality of protected site data files, in accordance with the restorative aspect of the present invention.

FIG. 6 is a diagram of a possible deployment scenario with 2 protected site data files deployed to 2 different cloud storage providers.

FIG. 7 is a diagram of a possible deployment scenario with 2 protected site data files deployed to a cloud storage provider, and a users home.

FIG. 8 is a diagram of a possible deployment scenario with 3 protected site data files deployed to a cloud storage provider, a users home, and a safe deposit box at the users financial institution.

FIG. 9 is a diagram of a possible deployment scenario with 2 protected site data files deployed to 2 different e-mail hosting providers.

DETAILED DESCRIPTION OF THE INVENTION

Overview

The present invention provides methods, systems and software products that may in turn be part of a larger software system or product, for protecting original files by converting them into a series of non-linear protected site data files, and collecting and restoring these protected site data files on a users computer system. The restore of the protected site data files can be further restricted to a plurality of allowed physical restore locations that is designated during the initial protection of the original files.

This approach to file protection empowers the user to choose their own physical and online storage sites for each of the individual protected site data files. The knowledge of the location of the storage sites chosen to store the protected site data files, along with the knowledge of which physical restore locations a restore is permitted from, become significant factors of protection, since it is challenging for an attacker to glean or reverse engineer this information as long as it is properly protected by the owner.

This challenge is magnified because, depending on the deployment approach, the attacker may also have to physically travel to one or more storage sites in order to collect the protected site data files necessary to restore the original files.

Additionally, once all protected site data files have been collected, the attacker must also be at a designated physical allowed restore location in order to restore the original files.

This approach to file protection is broad, and can be applied to many different data protection scenarios. An example of an especially useful application is for protecting files and information that needs to be stored, and might possibly be neglected over a long period of time.

Those skilled in the art will understand that the methods, data structures and software techniques that will next be described, can be implemented, using known computer software and hardware principles, on a conventional personal computer (PC/Mac) or other computing device or system, whether networked or standalone, desktop, server, handheld, wireless, Internet of Things (IoT) devices, or other digital processing platforms.

Method 1: File Protection Process

In accordance with an embodiment of the invention, and referring now to FIG. 1, a file protection method 100 employs an algorithm that sequentially iterates through each bit in a given input original input file, appending each successive bit to each in a series of output protected site data files.

The original file to be protected is opened for input at 104. Following this, a series of "nLoc" protected site data files is created and opened for output at 106. At 108, an array of output blocks is allocated that will hold the protected data, prior to being flushed to the protected output files. A counter, "loc" is used to identify the first/next protected site data file to write the next bit to, and is initialized to 1 at 110.

The first block of the input original file is read at 112. If the read is successful, an outer WHILE loop is entered at 114, which is responsible for iterating through the blocks of the input original file until EOF. At 116, an inner FOR loop commences, which is responsible for iterating through all of the bits in each input block, and distributing them across the array of output blocks.

At 118, each successive bit from the input stream is appended to the next successive output block at array index "loc", which is incremented by 1 at 120 and reset to 1 at 124 if it goes beyond the number of desired sites. Following this, at 128 the protected data in "arrOutputBlocks" is flushed to the protected output files, and the next block is read from the input original file at 130. The process continues until the end-of-file, or an error occurs.

Following the closure of the read loop the input original file is closed at 132, along with the output protected site data files at 134. The process then ends, resulting in nLoc output protected site data files, which can then be stored by the user at separate logical and/or physical storage sites.

This method is effective for protecting the original file from unauthorized access and reverse engineering, because it creates a collection of protected site data files—each of which is a partially depleted, nonlinear representation of the original file. Due to this form of representation, none of the protected site data files can be used individually or in multitude to reveal any usable part of the original file information without having all protected site data files available. Even if all of the protected site data files are somehow collected, an attacker still needs to be physically located at an allowed restore location, before they are permitted to restore the protected site data files. When this storage approach is coupled with the practice of storing each protected site data file in a separate physical or online storage site, or a mix of both, the result is an exceptionally secure method of file and information protection.

Method 2: Site Data File Collection/Regrouping Process

In accordance with another embodiment of the invention, and referring now to FIG. 2, a protected site data file collection method 200 employs an algorithm that automates the collection and regrouping of protected site data files that the user has previously deployed across separate physical and online storage sites.

The user is prompted to mount/provide the first media volume/folder/remote folder that contains protected site data files at 204. If they choose to continue, a WHILE loop is entered at 206 which will be responsible for repeatedly prompting the user for the first/next media volume/folder/remote folder to collect from. At 208 a check is performed for any protected site data files that exist in the media volume/folder/remote folder specified by the user. If any protected site data files exist, a WHILE loop is entered at 210-216 which copies all of the protected site data files from each user-specified media volume/folder/remote folder to a local system restore folder, from where the user can restore their original files. Following the successful collection of all protected site data files from each selected volume/folder, the user is notified of success at 218, and prompted for the next media volume/folder containing protected site data files at 220.

Following the closure of the outer WHILE loop at 222, the process ends at 224, resulting in the set of original protected site data files, stored in one local system folder location, in preparation for the restore process.

This method eases the process of collecting, identifying and regrouping the original protected site data files that the user has made available from folders on various storage media, in preparation for a restore.

Method 3: File Restoration Process

In accordance with another embodiment of the invention, and referring now to FIG. 3, a file restoration method 300 employs an algorithm that sequentially iterates through each successive bit in each successive byte, in each of a series of successive input protected site data files, appending each bit read, to the output original file that is being restored.

The original file to be restored is created for output at 304. Following this, the set of protected site data files is opened for input at 306. At 307, an array of "nLoc" protected site data file input blocks is allocated and initialized. A FOR loop at 308 is responsible for cycling through each protected site data file, checking and re-filling the input buffer for protected site data file "loc" at 310/312. At 316, each successive bit from each successive byte of the input buffer for "loc" is read. This bit is then appended back to the output original file at 318. This process repeats until an end-of-file or error occurs on one of the input protected site data files.

Following the closure of the read loop the output original file is closed at 322, along with the input protected site data files at 324. The process then ends, resulting in the original file that was protected being available for use by the user.

This method is effective for recombining the bits of data within the protected site data files, back to into their original files, so that these files may be accessed again.

Method 4: Encoding the Allowed Restore Locations into the Protected Site Data Files In accordance with another embodiment of the invention, and referring now to FIG. 4, a file restoration method 400 employs an algorithm that encodes a plurality of allowed physical restore locations designated by a user, and stores this encoded information across a plurality of protected site data files.

This process is executed before or after the protection of the original files described in Method 1. The resulting information is written into the protected site data files, alongside the protected original files.

A plurality of physical allowed restore locations that is designated by a user, and received from a user interface, is stored into an array "arrAllowedLocs" at 404.

At 406, this input array is then protected into an array of output buffers "arrOutputBuffers" using a subset of the steps which is used to achieve file protection. Refer to "FIG. 1. Flowchart of Protect Process" (116-126)".

A plurality of nLoc protected site data files are then opened for output at 408, followed by a FOR loop at 410, which is used to iterate "loc" through each output protected site data file. At 412, the protected allowed restore location data for this site "loc" is written to the site data file as a protected site header.

Following the end of the loop at 414, the output protected site data files are closed at 416. The process then ends at 418.

This method is effective for safely storing additional metadata about the protected site data files, and ensures it is protected from being extracted, without having all available protected site data files.

Method 5: Decoding the Allowed Restore Locations from the Protected Site Data Files In accordance with another embodiment of the invention, and referring now to FIG. 5, a file restoration method 500 employs an algorithm that decodes a plurality of allowed physical restore locations designated by a user, from a plurality of protected site data files, then determines whether the user is physically within a range designated by a restore radius "r" of one of these locations before authorizing a restore of the protected site data files.

This process is executed before authorizing the restore of the protected site data files described in Method 3.

At 504, an empty array of input buffers "arrInputBuffers" is allocated to hold the plurality of protected site header data from each site.

A plurality of nLoc protected site data files are then opened for input at 506, followed by a FOR loop at 508, which is used to iterate "loc" through each input protected site data file. At 510, the protected site header is read from the site data file "loc" and added to the array of input buffers "arrInputBuffers" at 512.

Following the end of the for loop at 514, the output protected site data files are closed at 516. At 518, an array of allowed restore locations "arrAllowedLocs" is allocated.

At 520, array of protected site header data "arrInputBuffers" is then restored into the array of allowed restore locations "arrAllowedLocs" using a subset of the steps which is used to achieve file restoration. Refer to "FIG. 3. Flowchart of Restore Process" (307-320)".

At 522, the users current physical location is obtained from their computing device, followed by a check at 524 to determine whether the users current location is within a range designated by a restore radius "r", of any location in the array of allowed restore locations.

If there is a match, at 526 the restore of the protected site data files is authorized. If there is no match, the restore of the protected site data files is denied at 528. The process ends at 530.

This method is effective for restoring additional metadata about the protected site data files, and protects it from being extracted, without having all available protected site data files.

Examples of Operation/Screenshots:

In accordance with a further practice and embodiment of the invention, FIG. 1A is a screenshot depicting the storage site selection area 1A00 of the invention that is part of the user interface to Method 1 of the present invention. The slider bar at 1A02 allows the user to select the number of storage sites they wish to use to protect their files. At 1A04, the user can specify the type of storage used at each storage site, including physical storage media and/or online storage services. This information is used to automatically size protected site data files for their intended storage media, and if desired, transfer them to their final location once the protection process has completed. The output of this screen includes the number of storage sites selected—nLoc which is input to Method 1, and determines the total number of protected site data files that will be created from the original files.

In accordance with a further practice and embodiment of the invention, FIG. 1B is a screenshot depicting the allowed restore location selection area 1B00 of the invention, that includes a zoomed-in map showing the selection of a single allowed restore location. This is the user interface to Method 4 of the present invention. From here, the user is able to select and remove from a plurality of allowed restore locations, by using a map to interactively designate where the protected site data files may be restored from. A restore will be permitted within a range designated by a restore radius "r", of each designated allowed restore location. At 1B02, the user selects the option to restrict the restore of the protected data files. At 1B04, the user can navigate the map (1B14) to specific named locations by entering the location in the field provided. Further navigation of the map, including zoom in, zoom out, zoom out fully, zoom in fully, zoom to current location, is possible by using the navigation controls at 1B12. At 1B06, or by using the mouse, the user can designate or remove allowed restore locations, shown at 1B16. At 1B08, the user can view the map in standard, satellite, or hybrid view. The output of this screen is a plurality of physical allowed restore locations, which is input to Method 4, and determines where the resulting protected site data files can be restored from.

In accordance with a further practice and embodiment of the invention, FIG. 1C is a screenshot depicting the allowed restore location selection area 1C00 of the invention, that includes a zoomed-out map showing the selection of several allowed restore locations. This is the user interface to Method 4 of the present invention. From here, the user is able to select and remove from a plurality of allowed restore locations, by using a map to interactively designate where the protected site data files may be restored from. A restore will be permitted within a range designated by a restore radius "r", of each designated allowed restore location. At 1C02, the user selects the option to restrict the restore of the protected data files. At 1C04, the user can navigate the map (1C08) to specific named locations by entering the location in the field provided. Further navigation of the map, including zoom in, zoom out, zoom out fully, zoom in fully, zoom to current location, is possible by using the navigation controls at 1C12. At 1C06, or by using the mouse, the user can designate or remove allowed restore locations, shown at 1C16. At 1C14, the user can view the map in standard, satellite, or hybrid view. The output of this screen is a plurality of physical allowed restore locations, which is input to Method 4, and determines where the resulting protected site data files can be restored from.

In accordance with a further practice and embodiment of the invention, FIG. 1D is a screenshot depicting the original file selection area 1D00 of the invention that is part of the user interface to Method 1 of the present invention. The user provides a name for this group of original files at 1D02—sessionName. The add, remove, and clear buttons at 1D06 allow the user to specify a list of original files that they want to protect at 1D04—selFiles. Selecting the next button at 1D08 will initiate Method 1 with the session name—sessionName, the number of sites—nLoc, and the selected original files—selFiles, as inputs.

In accordance with a further practice and embodiment of the invention, FIG. 2A is a screenshot depicting the protected site data file collection area 2A00 of the invention that is the user interface to Method 2 of the invention. The user repeatedly selects the add button at 2A06 to provide the storage site location (volume/folder/remote folder) of the first/next protected site data file(s). Following each storage site selection, the protected site data files from said storage site are collected and stored in a local system restore folder—the session folder. In addition, the user interface is updated at 2A04 to show which protected site data files have been collected, and which are remaining. When the user has finished collecting all protected site data files from all sites, a completion notification is displayed at 2A02, and the collection of the protected site data files is now completed. At this point, the protected site data files—the session—is now ready to be restored.

In accordance with a further practice and embodiment of the invention, FIG. 3A is a screenshot depicting the session restore area 3A00 of the invention that is the user interface to Method 3 of the present invention. The user selects the collection of protected site data files to restore—the session—from a list of available restore sessions at 3A02. At 3A04, the user selects the target folder to which the protected original files in this session will be restored to. Selecting the next option at 3A06 will prompt the user to proceed with the restore, which then initiates Method 4 to check the users current physical location against a plurality of previously designated physical allowed restore locations. Following this, Method 3 is initiated to restore the original files from the collection of protected site data files—the session.

In accordance with a further practice and embodiment of the invention, FIG. 3B is a screenshot depicting the denial of a restore (3B02) of a plurality of protected site data files from Method 4, and occurs when the user tries to restore protected site data files from the wrong physical location.

In accordance with a further practice and embodiment of the invention, FIG. 6 is a diagram of a possible deployment scenario with 2 protected site data files. Each protected site data file is deployed to a different cloud file storage provider—Google Drive, under the control of Google, Inc. and Apple iCloud Drive, under the control of Apple, Inc. Due to the partial and nonlinear storage nature of the protected site data files, if one cloud storage provider is breached, the protected site data file cannot be reverse engineered without the other site data file.

In accordance with a further practice and embodiment of the invention, FIG. 7 is a diagram of a possible deployment scenario with 2 protected site data files. One protected site data file is deployed to a cloud file storage provider—Google Drive, under the control of the provider—Google, Inc. The other protected site data file is deployed to a selected storage site at the users home, which is under the control of the user. Due to the partial and nonlinear storage nature of the protected site data files, if one site is breached, the protected site data file cannot be reverse engineered without the other protected site data file.

In accordance with a further practice and embodiment of the invention, FIG. 8 is a diagram of a possible deployment scenario with 3 protected site data files. One protected site data file is deployed to a selected storage site at the users home, under the control of the user. The next protected site data file is deployed to a cloud file storage provider—Google Drive, under the control of Google, Inc. The last protected site data file is deployed to a safety deposit box at the users finance institution, under the control of the finance institution. Due to the partial and nonlinear storage nature of the protected site data files, if one or two storage sites are breached, the protected site data files cannot be reverse engineered without the remaining protected site data file.

In accordance with a further practice and embodiment of the invention, FIG. 9 is a diagram of a possible deployment scenario with 2 protected site data files. One protected site data file is e-mailed as an attachment to one e-mail account owned by the user, and resides in their e-mail inbox, under the control of one e-mail hosting provider. The other protected site data file is sent to the user's other e-mail account, and resides in their e-mail inbox, under the control of another e-mail hosting provider. Due to the partial and nonlinear storage nature of the protected site data files, if one e-mail hosting provider is breached, the protected site data file cannot be reverse engineered without the other protected site data file.

CONCLUSIONS

Those skilled in the art will understand that the invention described herein by way of example provides significant protective advantages over the prior art, by enabling a user to protect original files by transforming them into a series of protected site data files that they can separate and distribute across several physical and/or online storage sites, which is difficult for an attacker to discover and physically obtain.

The original files are further protected, because the attacker must not only know the physical locations from where they are allowed to restore the protected site data files from, but they must also be physically present at one of these locations, in order to initiate the restore process.

Those skilled in the art will also appreciate that the foregoing examples are provided by way of illustration and detailed description, and that numerous variations, modifications, additions and changes are possible, and are within the spirit and scope of the invention.

Those skilled in the art will also appreciate that the methods, systems and software products of the present invention are applicable to a virtually unlimited range of computing platforms, including personal computers (PCs/Macs), mobile devices (iPhone, Android), Internet of Things (IoT) devices, or any other networked or standalone computing platforms. The methods, systems and software products described herein can also be used to protect files and file types other than those described by way of example above.

I claim:

1. A method for protecting original files from unauthorized access, comprising:
   reading each successive bit of each successive byte from each original file of a plurality of input original files, and, for each respective bit read from each successive byte from each original file, appending each respective bit of each successive byte to a respective successive byte of a respective successive protected site data file of a plurality of output protected site data files;
   reading each successive bit of each successive byte from an original plurality of input allowed physical restore locations, and, for each respective bit read from each successive byte from the original plurality of input allowed physical restore locations, appending each respective bit of each successive byte to a respective successive byte of a respective successive protected site buffer of a plurality of output protected site buffers;
   updating header content of each respective protected site data file of the plurality of output protected site data files with content within each respective protected site buffer of the plurality of output protected site buffers; and
   processing the plurality of output protected site data files, by storing each protected site data file of the plurality of output protected data files at a physical storage site or an online storage site, where at least one of the plurality of output protected site data files is stored at the physical storage site, and at least one of the plurality of output protected site data files is stored at the online storage site.

2. A method for restoring files protected from unauthorized access, comprising:
   processing a plurality of input protected site data files by retrieving each protected site data file of the plurality of input protected site data files from a physical storage site or an online storage site, wherein at least one of the plurality of input protected site data files is retrieved from the physical storage site, and at least one of the plurality of input protected site data files is retrieved from the online storage site;
   reading header content of each respective input protected site data file of the plurality of input protected site data files into each respective input protected site buffer of a plurality of input protected site buffers;
   reading each successive bit of each successive byte from each successive input protected site buffer, and, for each respective bit read from each successive byte from each successive input protected site buffer, appending each respective bit from each successive byte to a respective successive byte of a plurality of output allowed physical store locations;
   confirming that a user's current physical location is within a predetermined radius of at least one of the plurality of output allowed physical restore locations; and
   after confirmation, processing the plurality of input protected site data files, by reading each successive bit of each successive byte from each successive protected site data file, and, for each respective bit read from each successive byte from each successive protected site data file, appending each respective bit into an original file.

3. A computer program product for protecting original files from unauthorized access, the computer program product implemented on a computing device, wherein the computer program product comprises program instructions to:

receive a selection from a user on a first graphical user interface, indicating a plurality of selected input original files to protect;

receive a selection from the user on a second graphical user interface, indicating a designated plurality of input allowed physical restore locations;

receive a selection from the user on a third graphical user interface, indicating an input number of storage sites to be used to protect the plurality of selected input original files;

read each successive bit of each successive byte from each original file of the plurality of selected input original files, and, for each respective bit read from each successive byte from each original file, append each respective bit of each successive byte to a respective successive byte of a respective successive protected site data file of a plurality of output protected site data files;

read each successive bit of each successive byte from the designated plurality of input allowed physical restore locations, and, for each respective bit read from each successive byte from the designated plurality of input allowed physical restore locations, append each respective bit of each successive byte to a respective successive byte of a respective successive protected site buffer of a plurality of output protected site buffers;

update header content of each respective protected site data file of the plurality of output protected site data files with content within each respective protected site buffer of the plurality of output protected site buffers; and process the plurality of output protected site data files, by storing each protected site data file of the plurality of output protected data files at a physical storage site or an online storage site, where at least one of the plurality of output protected site data files is stored at the physical storage site, and at least one of the plurality of output protected site data files is stored at the online storage site.

4. A computer program product for restoring files protected from unauthorized access, the computer program product implemented on a computing device, wherein the computer program product comprises program instructions to:

receive a selection from a user on a first graphical user interface indicating a plurality of physical storage sites or online storage sites, where a plurality of input protected site data files are stored;

retrieve each protected site data file of the plurality of input protected site data files from the plurality of input physical storage sites or online storage sites, where at least one of the plurality of input protected site data files is retrieved from the physical storage site, and at least one of the plurality of input protected site data files is retrieved from the online storage site;

store each retrieved protected site data file into a local system restore folder, resulting in a plurality of retrieved input protected site data files;

receive a selection from the user on a second graphical user interface about which plurality of retrieved input protected site data files should be restored;

receive a selection from the user on a third graphical user interface about a target folder that the selected plurality of retrieved input protected site data files should be restored to;

read header content of each respective protected site data file of the selected plurality of retrieved input protected site data files into each respective input protected site buffer of a plurality of input protected site buffers;

read each successive bit of each successive byte from each successive input protected site buffer, and, for each respective bit read from each successive byte from each successive input protected site buffer, append each respective bit from each successive byte to a respective successive byte of a plurality of output allowed physical restore locations;

confirm that a user's current physical location is within a designated radius of at least one of the plurality of output allowed physical restore locations; and after confirmation, process the selected plurality of retrieved input protected site data files, by reading each successive bit of each successive byte from each successive protected site data file of the selected plurality of retrieved input protected site data files, and, for each respective bit read from each successive byte from each successive protected site data file, appending each respective bit into an original file.

* * * * *